United States Patent [19]
Cohen

[11] Patent Number: 5,812,848
[45] Date of Patent: Sep. 22, 1998

[54] SUBCLASSING SYSTEM FOR COMPUTER THAT OPERATES WITH PORTABLE-EXECUTABLE (PE) MODULES

[75] Inventor: Leonardo Cohen, Los Angeles, Calif.

[73] Assignee: Symantec Corporation, Cupertino, Calif.

[21] Appl. No.: 518,191

[22] Filed: Aug. 23, 1995

[51] Int. Cl.[6] ........................................ G06F 9/40
[52] U.S. Cl. .......................................... 395/685
[58] Field of Search .............................. 395/685

[56] References Cited

U.S. PATENT DOCUMENTS

| | | | |
|---|---|---|---|
| 5,274,819 | 12/1993 | Blomfield-Brown | 395/670 |
| 5,369,766 | 11/1994 | Nakano et al. | 395/685 |
| 5,619,639 | 4/1997 | Mast | 395/326 |

OTHER PUBLICATIONS

Kath, Randy, "The Portable Executable File Format Top from to Bottom", Microsoft Development Network Library, pp. (28), Jun. 1993.

Pietrak, Matt, "Windows Q&A", Microsofts system Journal, pp. (8), Aug. 1995.

Long, David, Dan Ruder, "Mechanics of Dynamic Linking", Microsoft, MSDN Library, pp. (7), Jan. 1993.

Marsh, Kyle, "Safe Subclassing in Win32", Microsoft, MSDN Library, pp. (7), Jan. 1994.

(no author), "Subclassing the Desktop and Windows of other Applications", Microsoft, MSDN Library, p(1), May 1995.

Baker, Steve, "It's Time for 32 Bits", Windows Tech Journal, pp. 28–35, Jun. 1994.

Richter, Jerry, "Load Your 32–bit DLL into another process's address space using INJLIB", Microsoft Systems Journal, pp. (40), May 1994.

Oney, Walter, "Mix 16–bit and 32–bit code in your applications with the Win32s Universal Thunk", Microsoft Systems Journal, pp. (30), Nov. 1993.

Bender, Steven L., Entry–Level Network Management, Stacks, p(12), Nov. 1994.

M. Pietrek, "Peering Inside the PE: A Tour of the Win32 Portable Executable File Format", Microsoft Systems Journal, Mar. 1994, pp. 15–34.

M. Pietrek, "Learn System Level Win32 Coding Techniques by Writing an API Spy Program", Microsoft Systems Journal, Dec. 1994, pp. 17–44.

*Primary Examiner*—Alvin E. Oberley
*Assistant Examiner*—St. John Courtenay, III
*Attorney, Agent, or Firm*—Fliesler, Dubb, Meyer & Lovejoy

[57] ABSTRACT

The export record of an operating system kernel employing dynamically-linked loading modules (e.g., portable-executable modules) is thunked so as to globally and forcibly redirect service requests from afterwards loaded modules to subclassing routines instead of to original servicing routines of the kernel. The base location of the kernel is determined from an Image_Base entry of its disk-image. An offset storing position in the export record is overwritten with a value equal to the value of the address of the subclassing routine minus the kernel's base address. Use of the thunked export record is forced even for 'bound' external references by altering the time stamp in the kernel's export record to a nonmatching value.

21 Claims, 7 Drawing Sheets

SUBCLASSING SYSTEM FOR COMPUTER THAT OPERATES WITH PORTABLE-EXECUTABLE (PE) MODULES

BACKGROUND

1. Field of Invention

The invention relates generally to computer systems in which two or more program modules, each having internally prelinked portions, are loaded into system memory and further in which, either at the time of loading or during a subsequent run-time of a given module, further links are established from the given module to an external module.

The invention relates more specifically to the problem of how to perform subclassing for an operating system that operates with modules conforming to the portable-executable (PE) format or to a like format wherein modules have import and export data sections that are consulted for purposes of creating inter-module links.

2. Cross Reference to Related Publications

The following publications are believed to be loosely related to the present application and are cited here for purposes of reference and background:

(A) M. Pietrek, "Peering Inside the PE: A Tour of the Win32 Portable Executable File Format", Microsoft Systems Journal, March 1994, pp 15–34; and (B) M. Pietrek, "Learn System_Level Win32 Coding Techniques by Writing an API Spy Program", Microsoft Systems Journal, December 1994, pp 17–44.

3. Description of Related Art

The term 'subclassing' refers generically to a method wherein one starts with a predefined computer operating system (OS), or another predefined program, that has predefined, callable services and one thereafter adds one or more new features to the operating system (or to another like program) such that, when one of the predefined services of the OS (or of the other like program) is requested by an external application program, the newly added features will be executed in place of or in addition to the original services.

Traditional subclassing relies on an operation referred to here as 'global vector-table thunking'.

In 'global vector-table thunking', an alteration is made to a globally-constant location of memory through which all application programs normally gain access to services of the memory-resident OS.

The alteration to this globally-constant location forces global redirection of the normal service calls of all application programs to a new location of memory rather than to the location originally dictated by the globally-constant memory-location.

In terms of a more concrete example, consider the Microsoft DOS™ operating system that was established for 8086 class and higher microprocessors (e.g., 286, 386, 486, etc. versions of which are available from Intel Corporation of Santa Clara, Calif.).

Consider how application programs normally interface with MS-DOS™ through its API.

(API stands for application program interface. Microsoft DOS™ and its alternate designation, MS-DOS™ are recognized trademarks of Microsoft Corporation of Redmond, Wash.)

Under Microsoft DOS™, application programs normally access predefined operating system services by way of software interrupts (INT's in general, and more commonly through a software interrupt known as INT_21).

Each software interrupt (INT) vectors to a respective and globally-constant location in a lower address region of system memory. This region is sometimes referred to as the 'Interrupt Vector Table' (IVT). Here, the CPU finds a new address or vector to which the CPU automatically branches when the INT is executed.

During boot-up or other initialization of MS-DOS™, locations within the Interrupt Vector Table (IVT) are filled with vectors that point to predefined entry points of respective interrupt service routines found in the main body of MS-DOS™.

Thereafter, when an application program executes a software interrupt (e.g., INT_21)—after having set up appropriate values in the CPU registers—the corresponding interrupt vector in the IVT re-directs control to another location in system memory that contains the predefined interrupt service routine.

The interrupt service routine for INT_21 normally includes a dispatcher that redirects program flow to an entry point of a particular executable service module within the main body of the operating system in accordance with request flags indicated by the register settings of the interrupting application program.

The above, indirect approach of getting to MS-DOS™ service procedures through an IVT rather than going to directly to such service procedures is used so that newer versions of the operating system can be introduced while maintaining backward compatibility with application programs written for older versions of the OS.

To subclass within MS-DOS™ or a like operating system environment, a 'vector-table thunk' is performed on a given INT vectoring location within the globally-constant Interrupt Vector Table.

'Vector-table thunking' in this case simply means, overwriting the pre-initialized data within the globally-constant location of the given INT (e.g., the vector storing location of INT_21) with a new address value that redirects control to a new interrupt service routine. The new interrupt service routine may then dispatch (redirect program flow) to one or more newly-added subclassing procedures as desired.

From the above it is seen that subclassing of the OS is relatively trivial to carry out within an operating system environment such as that of Microsoft DOS™. Because API service calls are normally made through predefined, globally-constant locations of system memory, a simple thunk globally re-directs all calls to the desired new location.

When one works within other kinds of operating system environments where there is no globally-constant vectoring table (e.g., as is the case for the Win32 subsystem of Windows95™), one cannot rely on simple vector-table thunking for performing subclassing.

(Windows95™ is a recognized trademark of Microsoft Corporation of Redmond, Wash. Win32 is an industry-standardized operating system specification that is supported by Microsoft Corporation.)

These other kinds of operating system environments (e.g., the Win32 subsystem of Windows95™) provide more flexibility to software developers by allowing for upload-time or run-time dynamic-linking between pre-compiled, internally-prelinked modules (statically-linked modules).

The term 'dynamic-linking' is used herein to generally refer to the type of linking that occurs within the executing platform and/or executing software environment. The term 'static-linking' is used herein to generally refer to the type of linking that occurs outside the executing platform and/or executing software environment such as when object code is compiled on one platform for execution on another platform. However, static-linking could be carried out if desired on the same hardware platform that ultimately executes the statically-linked portions of the module. The above are therefor not bright line definitions. 'Static-linking' is to be understood as generally referring to the type of intra-module linking that is carried out for example at compile-time or link-time. 'Dynamic-linking' is to be understood as generally referring to the type of inter-module linking that is carried out for example at upload-time or run-time.

'Upload-time' refers to the time when a disk-image or a like, system-memory non-resident image of code is mapped or relocatably transferred into system memory.

Under the above-mentioned, more flexible kinds of OS's, software developers can independently write individual source code routines (e.g., in C code or C++ code) and compile each such routine for execution by a target CPU. These compiled object code packages may be only partially-resolved, meaning there may be some references to code or data structures outside of the pre-compiled object code packages.

Software developers can link a selected subset (e.g., a library) of the precompiled object code packages to form an internally-linked (internally cohesive) and relocatable 'module'.

Many different modules can be generated. The linker-generated modules can then be stored on a system disk, or on a floppy diskette, or elsewhere as static-images.

Thereafter, when desirable, the code of one or more statically pre-linked, disk-resident modules (e.g., .EXE or .DLL static-images) can be fetched and relocatably uploaded into system memory while simultaneously (dynamically) cross linking the code of the uploading module with the code of other modules that are similarly uploaded into system memory.

A complex, internally cohesive program can be thereby dynamically created in system memory of the code-executing platform.

A so-called 'dynamically-linking loader' (e.g., a PE loader) may be used for converting disk-images (or other static-images) of the prefabricated modules into memory-resident, immediately-executable code that is appropriately cross linked to the memory-resident code of other, previously uploaded modules.

During such uploading of static-images, the disk-image or other static-image of a selected module is 'mapped' into an available free region of system memory (e.g., to system RAM). The linking-loader makes address relocation adjustments to the uploading code as needed. And the linking-loader tries to resolve any references to points of external modules if such references have not been previously resolved via static-linking.

Given that each module is individually relocatable and loadable at different instances, it is common practice to provide within each module, a private, upload-time relocatable, import data section (.idata) through which links are made from the given module to external modules.

The private, upload-time relocatable, import data section (.idata) of each module is used in place of the globally-constant vectoring table (e.g., an IVT) of operating systems such as MS-DOS™ to establish linkages to shared external services, such as those of a memory-resident operating system kernel (OS kernel).

Because a globally-constant vectoring table (e.g., an IVT) is not used in such instances for establishing linkages to the callable services of the OS kernel, subclassing the services of the operating system kernel becomes a problem.

The so-called 'portable-executable' (PE) format is an example of an individually-relocatable and upload-time linkable module structure. The PE format is specified for Win32-compliant programs.

Under the PE format, each application program (or other portable-executable module) is given its own private 'import data section' (.idata). At upload-time, the linking-loader is expected to fill in any yet unresolved vector locations of the import data section (.idata) so as to give the then-loaded module access to the services of other, external modules.

Each PE-compliant application program (or other portable-executable module) that is willing to export code for use by external modules is expected to provide a respective 'export data section' (.edata) that is to be used to locate entry points of exportable code sections within that module.

If, prior to upload-time, a reference made within a given first module to an external service of a second module is not resolved, the export data section (.edata) of the 'external' second module is normally used by the linking-loader during the uploading of the first module to link the first module to the external second module.

The export data section (.edata) of an external PE module is also sometimes accessed by a so-called 'GetProcAddress routine' of the OS kernel to locate at run-time the entry points of exportable code sections of the external PE module. (GetProcAddress is typically used to carry out run-time dynamic-linking to a run-time specified service of a run-time specified external module.)

One advantage of the Win32 environment is that the private import data section (.idata) of one Win32-compliant module can be privately modified after link-loading to reconnect that one module to external modules other than those that the one module was originally configured for.

If for some reason, an improper alteration is made to the private import data section (.idata) of the one reconfigured module, such a local alteration does not interfere with the ability of other, unaltered modules to continue to call on the OS kernel by way of their respective, 'private' import data sections. Thus the overall system is kept fairly 'robust'.

The privatized linking feature of Win32 is exploited in the above-cited article of Matt Pietrek, "Learn System-Level Win32 Coding Techniques by Writing an API Spy Program", to redirect the kernel calls of one specific module to a spying program. An identification is made of the idata portion within the to-be spied-upon module. This private import data section (.idata) of the to-be spied-upon module is thunked so as to redirect OS kernel calls to a predefined spying program instead of letting the calls proceed normally to the kernel.

It has been briefly suggested that perhaps the method used in Matt Pietrek's article, "Learn System-Level Win32 Coding Techniques by Writing an API Spy Program" could be used to solve the problem of subclassing the Win32 operating system.

There are several shortcomings to this proposal. First it should be noted that Pietrek's method is constructed for spying on one singular, RAM-resident module. It is not intended to spy on all modules. Each module must be individually thunked at the time one wishes to spy on that module.

Second, Pietrek's spying method does not provide global redirection. Each installed module has its own private import data section and needs individual, timely modification.

Third, if GetProcAddress is used at run-time to dynamically-link with a given kernel service, the private import data section (.idata) that has been thunked by Pietrek's spying method will not be consulted by the GetProcAddress procedure, and the run-time dynamic-linking performed via GetProcAddress will direct calls for kernel services to the original entry points of the operating system kernel rather than to Pietrek's spying program.

A different approach is needed for making sublassing feasible within the Win32 and like environments.

SUMMARY OF THE INVENTION

The above-mentioned problems are overcome in accordance with the invention by timely modifying (thunking) the export data section (.edata) and additional parts of the operating system kernel (or another module that is to be subclassed) soon after the OS kernel (or the other module) has been loaded.

The modifications to the OS kernel (or to the other to-be subclassed module) are made in such a manner that all afterwards and normally-loaded PE modules are forced to import the pre-thunked export-defining entries of the kernel (or of the other to-be subclassed module) into their private import data sections (.idata) and to use the pre-thunked values even if the later-loaded PE modules rely on compile-time or link-time 'binding' and even if the later-loaded PE modules use GetProcAddress or a like procedure to dynamically create links to the kernel (or to the other to-be subclassed module) at run-time.

A method in accordance with the invention comprises the steps of: (a) detecting completion of loading of the operating system kernel (or of the other to-be subclassed module); (b) determining the base address of the OS kernel module (or of the other to-be subclassed module); (c) using the determined base address to locate within system memory, the portable executable header (PEH) of the operating system kernel (or of the other to-be subclassed module); (d) fetching the export pointer within the located PEH and using the export pointer to access the export data section (export record) of the operating system kernel (or of the other to-be subclassed module); (e) locating the name of the service to be subclassed in the names_array of the export record; (f) indexing to the corresponding ordinal in the ordinals_array of the export record; (g) locating the corresponding offset position in the functions_array of the export record and overwriting the located offset position with a value equal to the desired new subclassing address minus the image base address (Image_Base) of the operating system kernel (or of the other to-be subclassed module), the new subclassing address being the address to which the service call is to be redirected. The new address can be a dispatcher which redirects control to an appropriate subclassing routine.

The new subclassing routine can provide a variety of useful functions. For example, if the program-launching services of the OS kernel are subclassed so to first go to a virus detecting/blocking routine before the requested programs are launched into system memory for execution, protection against undesirable virus infection may be provided within a Win32 or like environment. The virus detecting/blocking routine would scan each to-be launched program before allowing it to launch. The virus detecting/blocking routine would block launching and/or flash a warning and/or take other corrective action if the signature of a virus is detected prior to launching.

By way of further example, a global snooping routine could be subclassed onto a particular service of the OS kernel to detect all application programs that call on that service. After detection and history collection, each of the calling application programs can be fine-tuned such that each makes more efficient use of the called kernel service based on the calling history of that application program.

A machine-implemented system is provided in accordance with the invention for subclassing an exportable service of a first loaded module with respect to afterwards-loaded service-importing modules, wherein the first module has a relatively-locatable export record that may be used for resolving external links during uploading into system memory of one or more of the service-importing modules, said system comprising: (a) detecting means for detecting completion of the loading of the first module into system memory; (b) locating means for locating the relatively-locatable export record of the first module and for locating the vectoring position of said service within the located export record; (c) thunking means for writing a redirecting value into the located vectoring position of the first module after the first module is loaded, the redirecting value redirecting to a predefined subclassing address, those external links that are later resolved during the loading of one or more of the service-importing modules; and (d) forcing means for forcing use of the thunked export record of the first module during subsequent uploading into system memory of the one or more of the service-importing modules.

Other aspects of the invention will become apparent from the below detailed description.

BRIEF DESCRIPTION OF THE DRAWINGS

The below detailed description makes reference to the accompanying drawings, in which.

DETAILED DESCRIPTION

Figure 1A:
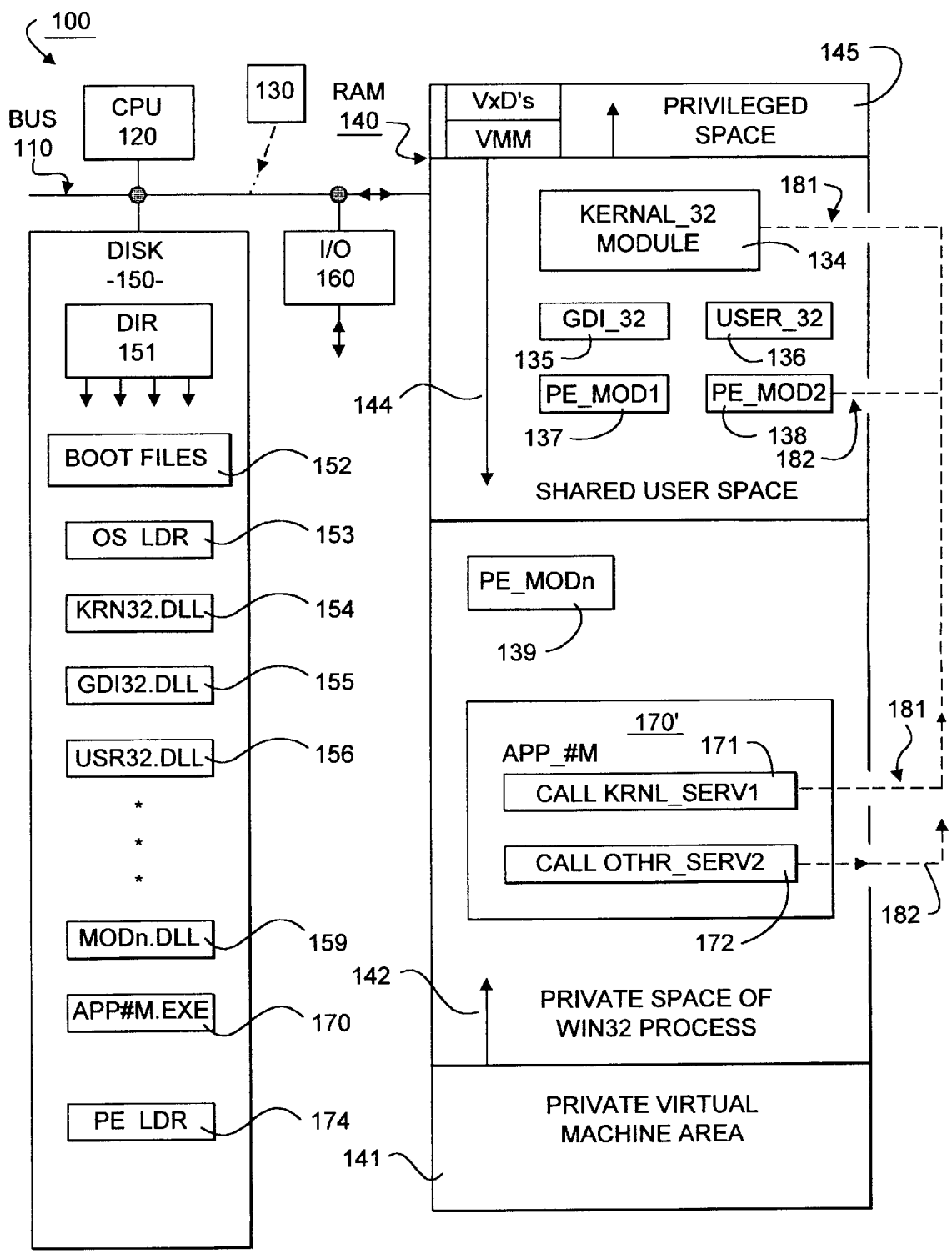
FIG. 1A is a block diagram of a computer system having Win32-compliant data structures within system memory.

FIG. 1 is a block diagram of a computer system 100 that may be used in accordance with the invention. Computer system 100 includes a system bus 110 coupling a system memory 140 such as a random access memory (RAM) to a plurality of other system resources including a system CPU 120, a nonvolatile disk subsystem 150, and system I/O 160.

The system memory 140 may comprise an assorted type of high-speed random access devices into which immediately executable code may be stored. System memory 140 can include one or more of static RAM, dynamic RAM, and other like devices. Typically at least part of the system memory 140 is volatile, meaning data is lost and must be rewritten when power is lost, although it is not outside the contemplation of the invention to have system memory 140 defined by non-volatile random access memory devices such as flash EEPROM. Often the computer system 100 will include a small boot ROM (not shown) coupled to the CPU 120 for power-up and other re-bootings of the system.

When system 100 boots-up, various files are automatically loaded from the disk subsystem 150 or from elsewhere (e.g., from system I/O 160) into system memory 140 to thereby create a collection of data structures within system memory 140. These data structures normally include executable instruction code that can be immediately executed by a responsive data processing unit such as the illustrated central processing unit (CPU) 120 of FIG. 1 or by non-centralized multiple data processing units (not shown) that may be further or alternatively coupled to bus 110.

The system I/O module 160 uses bus 110 for transferring data between one or more of the illustrated portions of system 100 and external devices. In one embodiment, the system I/O module 160 may couple the illustrated system 100 to a local area network (LAN) or to a wide area network (WAN) or to other external data transceiving and processing means.

The disk subsystem 150 includes a drive (not separately shown) and a data storage medium (not separately shown) onto which data may be stored and from which data may be retrieved. The disk data storage medium may be in the form of a magnetic hard disk, or a floppy diskette, or a re-writable optical disk, or other such non-volatile, randomly accessible, re-writable media. ROM or Flash EEPROM may be alternatively used in carrying out some or all of the nonvolatile data storing functions of the disk subsystem 150.

Data is recorded on the disk subsystem 150 to define a directory structure 151 and a plurality of files (not all shown) such as automatic boot-control files 152, an OS loader program 153, device drivers (e.g., V×D's shown in area 145), a disk-image 154 of an OS kernel module (KRNL32.DLL), a disk-image 155 of a graphical device interface module (GDI32.DLL), a disk-image 156 of a user interface module (USR32.DLL), and further disk-images (e.g., 159, 170) of other link-loadable modules (e.g., MODn.DLL, APP#M.EXE).

Code 174 for a PE loader is included on the disk subsystem 150. The PE loader code 174 may reside inside the disk-image 154 of the OS kernel module (KRNL32.DLL) and is usable for uploading PE modules into system memory 140.

The data recorded on the disk subsystem 150 may be brought into subsystem 150 through a variety of data conveying means 130 including but not limited to: floppy diskettes, compact-disks (CD ROM), tape, and over-a-network downloading by a file server computer or the like.

In the Windows95™ environment, an initial system operating system such as MS-DOS™ resides non-volatilely on the disk subsystem 150 and is initially loaded into system memory 140 at power-up or re-boot time. Thereafter, additional data structures are loaded into the system memory 140 using the initial system operating system (MS-DOS™) as springboard booter. The boot-up of Windows95™ includes installation of virtual machine manager code (VMM code), virtual device drivers code (V×D's), Win16 operating system code and Win32 operating system code into various privileged and non-privileged areas of system memory 140.

In the case where one or more Win32 threads are to execute within a corresponding process (there can be more than one Wind32 process running simultaneously on system 100, but each Wind32 process executes in its own memory context—that is, in its own private Wind32 process area), the virtual address space of system memory 140 is subdivided to include: (a) a private virtual machine area 141; (b) a private Wind32 process area 142; (c) a shareable user space (global space) 144; and (d) a privileged space 145.

FIG. 1A shows the system memory 140 in a state where a virtual machine manager (VMM) has been loaded into the privileged space 145 together with one or more virtual device drivers (V×D's). The virtual machine manager (VM) defines a privileged part of the operating system environment that application programs are supposed to—but do not necessarily—honor as being user-inaccessible. The virtual device drivers (V×D's) are operatively coupled to the VMM for responding to system status messages broadcast by the VMM.

FIG. 1A further shows the system memory 140 in a state where first RAM-resident code 134 defining a Wind32 operating system kernel (KERNEL_32) has been mapped from disk region 154 into the shared user space 144. Unlike the VMM, the KRNL_32 module 134 defines a non-privileged, understood to-be user-accessible part of the operating system environment.

In the particular illustrated state of FIG. 1A, after the loading of the OS kernel 134, second RAM-resident code 135 defining a Wind32 graphical device interface (GDI_32) has been loaded from disk region 155 into a lower portion of the same shared user space 144 of memory 140. Thereafter, third code 136 defining a Wind32 user interface (USER_32) has been loaded from disk into the shared user space 144. Following this, additional PE (portable-executable) modules have been loaded from various library areas (not shown) of disk subsystem 150 into the shared user space 144, such PE modules PE_MOD1 (137) and PE_MOD2 (138). Like, modules 137 and 138, each of the earlier-loaded blocks 134, 135 and 136 that reside in the shareable user space 144 has a portable-executable (PE) format.

The module-occupied portion of the shared user space 144 generally grows downwardly from upper memory towards lower memory as indicated by the downwardly pointing arrow drawn in space 144. A preferred upload-destination address (Image_Base) is often defined within the disk-image (154, 155, etc.) of each PE module. In cases where free RAM space is available to accommodate the preferred upload-destination, the loader that maps disk-images of modules to RAM-resident images will try to accommodate the preference of each uploading module. However, in cases where the preferred RAM space is already occupied, the uploading module is usually instead relocated to a next-lower accommodating space in the shareable user space 144. Thus in general, the specific location of each next loaded module can depend on when and which modules were previously loaded into or unloaded from system memory.

In the particular illustrated state of FIG. 1A, after the OS kernel 134 and some other basic operating system modules such as GDI 135 and USER 136 have loaded, code for private application programs such as PE_MODn (139) has been mapped from respective disk regions such as 159 into the private Wind32 process area 142. The module-occupied portion of the private Wind32 process area 142 generally grows upwardly from lower memory as indicated by the upwardly pointing arrow drawn in space 142. Such upward expansion of used space is again carried out under the caveat that the loader tries to accommodate the upload-destination preferences defined in the module disk-images (e.g., 159) when such free space is available. Thus, in general, the specific location within private Wind32 process area 142 for each next loaded private module may depend on which private modules were previously loaded or unloaded.

During the uploading of each module's static-image (154–159) into system memory 140, those cross references of each uploading module that point to locations outside of their respective module are generally resolved at upload-time if they had not been resolved previously (that is, if they had not been resolved statically by link-time).

By way of example, assume that at some point in the history of system 100, a Win32-compliant application program named APP_#M and stored as file 170 on the disk subsystem 150 is being link-loaded into a subregion 170' of the private Wind32 process area 142. (The notation 170 is often used herein to refer to the disk-image of APP_#M while the notation 170' is used to refer to the RAM-resident image of APP_#M. In some instances, as will be apparent from context, 170 may refer to both the static-image and dynamic-linked image of a given module.)

Assume that the uploading application program APP_#M includes a yet-unresolved CALL to an OS kernel service named 'KRNL_SERV1' as indicated at 171. Suppose, as further indicated at 172, that the uploading application program APP_#M also has a yet-unresolved CALL to an external service routine named 'OTHR_SERV2', where the latter resides within another external module such as PE_MOD2 (138).

Figure 2A:
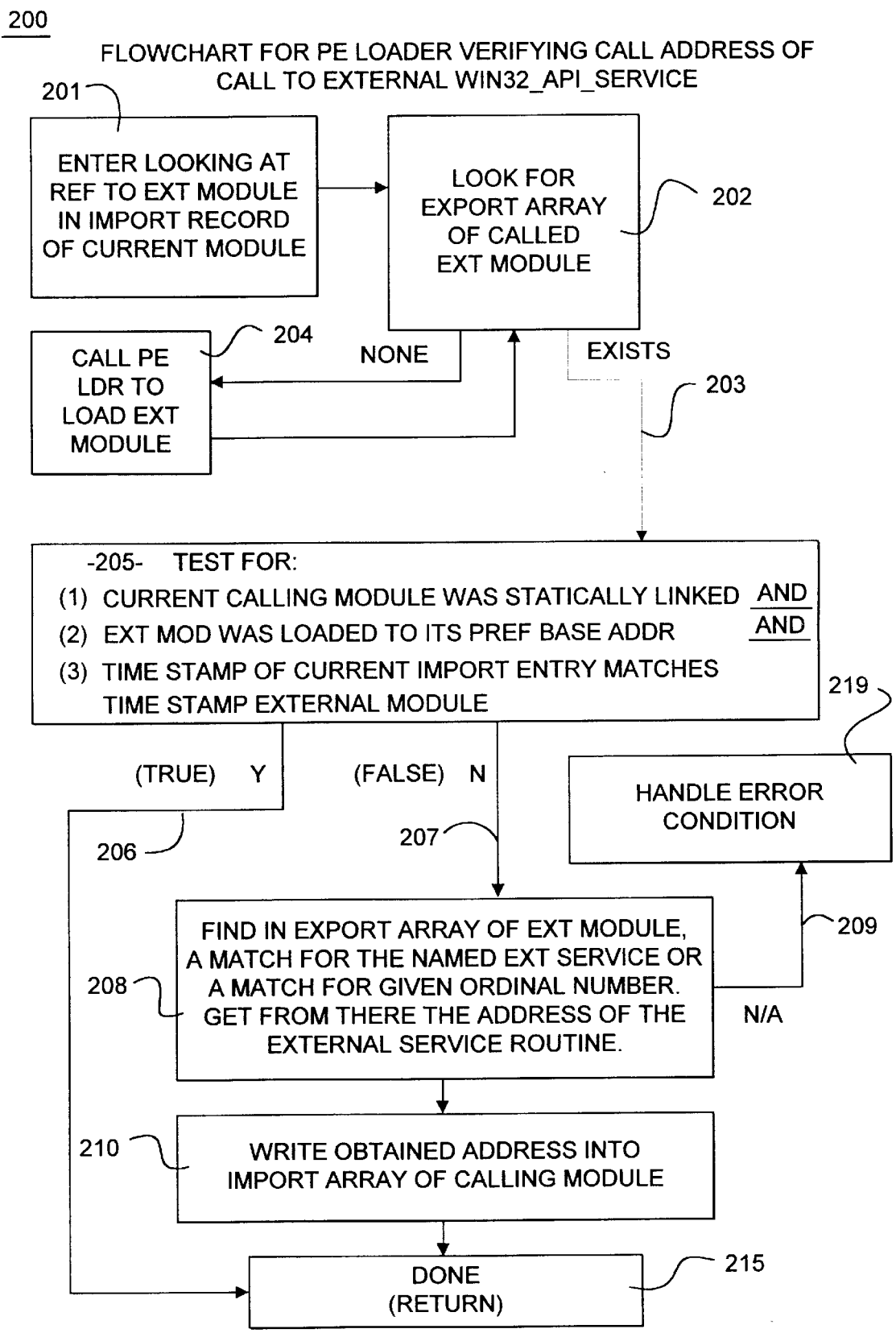
FIG. 2A is a flow chart showing how the export array of a service-exporting module is consulted during link-loading of a service-importing module into system memory.

A PE loader such as 174 tries to dynamically resolve the yet-unresolved branches 171 and 172 during uploading in accordance with a linkage validating procedure 200 such as set forth in FIG. 2A.

Before considering the linkage validating procedure of FIG. 2A, it may be useful for those who are not totally familiar with PE modules to consider the material provided in FIGS. 1B and 2B respecting certain select parts of the PE structure that are relevant to the below discussion module and respecting a mechanism used by PE modules to call on external service routines.

Figure 1B:
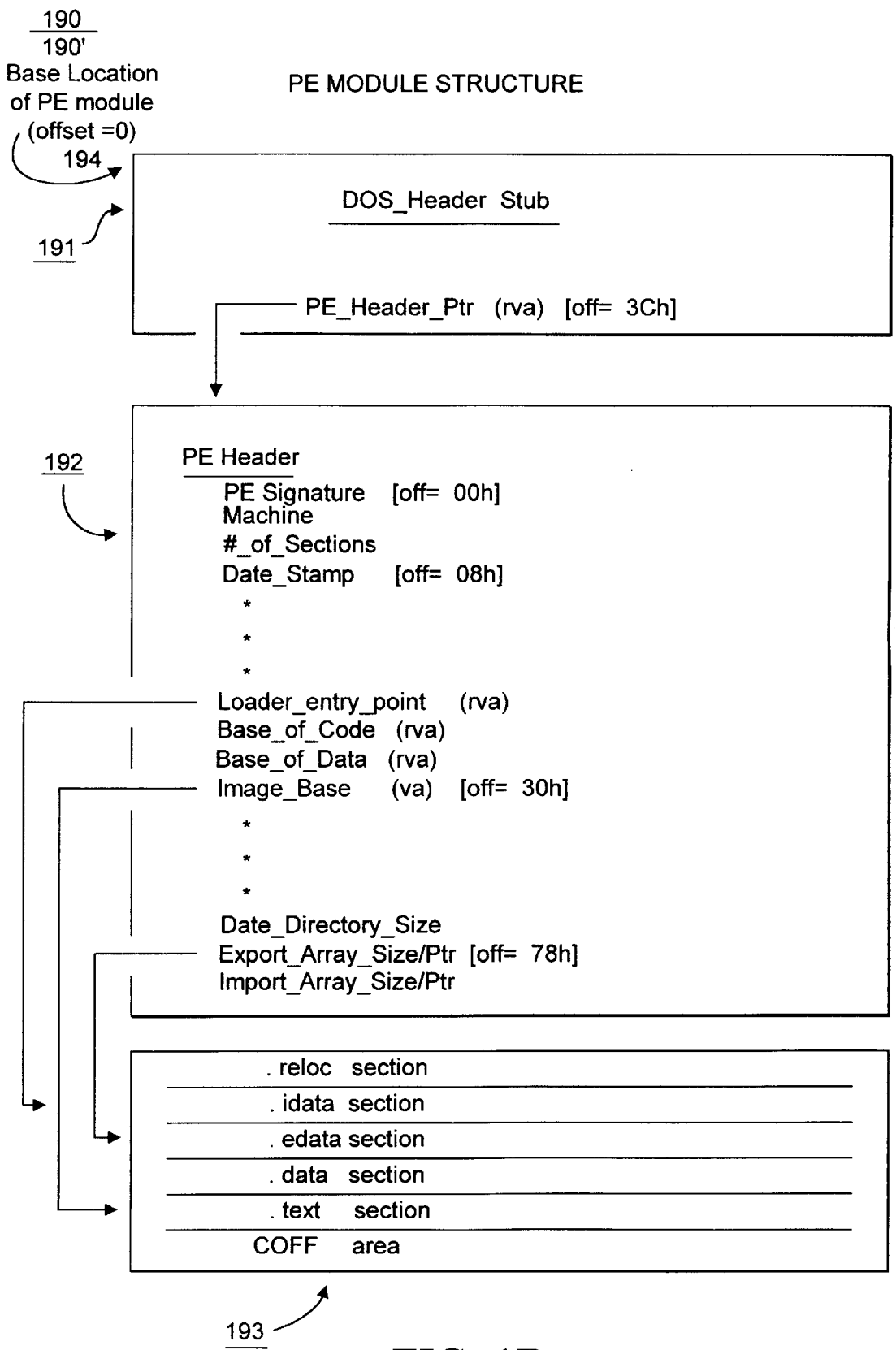
FIG. 1B is a block diagram showing selected parts of the data structure of a portable-executable module.

FIG. 1B shows some selected portions of the data structure of a PE module.

Each PE module usually first resides on disk subsystem 150 as a complete file that is referred to here as the PE disk-image 190. During uploading to system memory 140, the loader maps the data of the disk-resident PE module 190 to memory such that the corresponding RAM-resident image 90' occupies one contiguous block of system memory 140. (Note that the non-apostrophized notation 190 is used for referencing the disk-image (static-image) of the PE module and the apostrophized notation 190' is used for referencing the memory-resident version.)

Where possible, the linking-loader (usually the RAM-resident version of PE loader 174) tries to upload the disk-image 190 into a contiguous region of system memory 140 beginning with the disk-image's preferred upload-destination address (which virtual address is defined in nonrelative terms by an Image_Base entry in the module's PE header, discussed below).

Executable code within the PE disk-image 190 is usually pre-compiled and pre-linked internally (statically) so as to be immediately executable if uploaded to the preferred upload-destination address (the Image_Base). If the preferred upload-destination address can be accommodated then the linking-loader (PE loader 174') does not have to patch the code to adjust for relocation. Otherwise, the code does have to be reconfigured to account for relocation of the PE's RAM-resident image 190' to a system memory area other than that specified by the Image_Base entry in the PE disk-image 190. (Note that multiple instances 190', 190", 190'", etc. of the one PE disk-image 190 can be uploaded to coexist simultaneously in system memory 140 if desired.)

In terms of its logical structure, the PE module (190 or 190') may be thought of as having three major parts: a pseudo header 191, a real header 192, and a main body 193.

The pseudo header 191 is often also referred to as the 'DOS_header stub' 191 or simply the 'DOS header' 191. Once uploaded into system memory 140, the start of the DOS header 191 is referred to as the base location 194 of the PE module 190'.

Because the PE module 190' is relocatable within the virtual address space of system memory 140, address specifications within the PE structure 190/190' are generally given in terms of relative virtual addresses (rva) rather than absolute virtual addresses. A relative virtual address (rva) defines an offset relative to the base location 194 of the RAM-resident PE module 190'. When one is given an rva (a relative virtual address) for a particular data item, one generally needs to add the absolute virtual address value of the mapped base location 194 to the rva in order to obtain the absolute address of the data item in virtual address space.

There is a so-called PE_header_pointer at a predefined position (offset=3 C hex bytes relative to base location 194) within the DOS header stub 191 which points in terms of relative virtual address to the beginning of the real PE header 192. The DOS header stub 191 has a variable length.

The real PE header 192 is a complex structure having many subsections. Only a few selected ones are shown in FIG. 1B.

The first entry in the PE header 192 is an ASCII text area which stores a 'PE signature' such as "PE/O/O".

Following the PE signature there is a 'Machine-type' code which designates the type of CPU (e.g., 386 or other) for which this module has been compiled.

Further down in the PE header 192 is another entry ('#_of_Sections') which indicates the number of 'sections' that are to be expected in the main body 193 of the PE module 190.

Below this there is a time/date stamp ('Date_Stamp') which indicates the time in terms of seconds after 4:00 p.m., Dec. 31, 1969, at which the disk-image 190 of this PE module was produced either by a compiler or a linker.

Yet further down in the PE header structure 192, there are provided a number of specifications for the different 'sections' that are to be found within the main body 193 of the PE module 190'. One such specification ('Loader_entry_point') tells the linking loader (in rva terms) where to begin processing relocatable code. Another specification ('Base_of_Code') indicates in terms of rva where the base of code sections (e.g., text) for this PE module 190' begins. Yet another specification ('Base_of_Data') indicates where the base of the module's data sections (e.g., data) begin.

In some instances, the load linker is directed to try to map the relocatable PE module 190' to a predefined, preferred area of system memory. This preference is defined in terms of absolute virtual address (va) by the Image_Base specification that is usually located at an offset of 30 hex bytes (off=30h) relative to the start of the real PE header 192. If the PE module's RAM-resident image 190' is loaded to its preferred Image_Base, the linking loader does not need to patch relocatable code to account for relocation. The thus-mapped module 190' is already preadjusted by the compiler and linker to have correct address values for the Image_Base.

Another, so-called 'characteristics' portion of the PE header 192 indicates whether the code sections of the PE module contain executable image code that do not require any relocation adjustments if the Image_Base preference is satisfied by the linking-loader.

Further down in the real PE header 192 there is a Data_Directory structure which includes pointers and other specifications (e.g. regarding the size of each section) for respective export and import arrays of the PE module. One such pointer is the Export_Array_Ptr.

The Export_Array_Ptr is usually located at an offset of 78 hex bytes (off=78 h) relative to the start of the real PE header 192. The Export_Array_Ptr identifies in terms of relative virtual address (rva) the start of an .edata section (export array section) within the main body 193 of the PE's RAM-resident image 190'.

The body portion 193 of the PE module 190' contains the actual code and data sections. Information regarding the relative locations, the sizes and other features of the code and data sections is recorded within the PE header portion 192 as already mentioned.

A so-called '.reloc section' of the main body 193 contains a table of base relocations that are to be used by the linking-loader when loading modules to locations other than their preferred Image_Base.

A so-called '.idata section' of the main body 193 contains import data arrays (or 'import records') through which this PE's RAM-resident image 190' imports services from external modules. A corresponding import record is usually created for each external module having services that are to be imported by the present PE module 190'.

A so-called '.edata section' of the main body 193 contains an export array (or an 'export record') through which the present PE module 190' exports the entry points to its internal services to importing modules.

A so-called '.text section' of the main body 193 contains the executable code of this PE module 190'. The executable code of the PE disk-image 190 can be in relocatable or nonrelocatable format.

A so-called '.data section' of the main body 193 contains fixed and variable data that may be used by the .text section.

A so-called 'COFF area' of the main body 193 services so-called 'Common Object File Format' data.

Figure 2B:
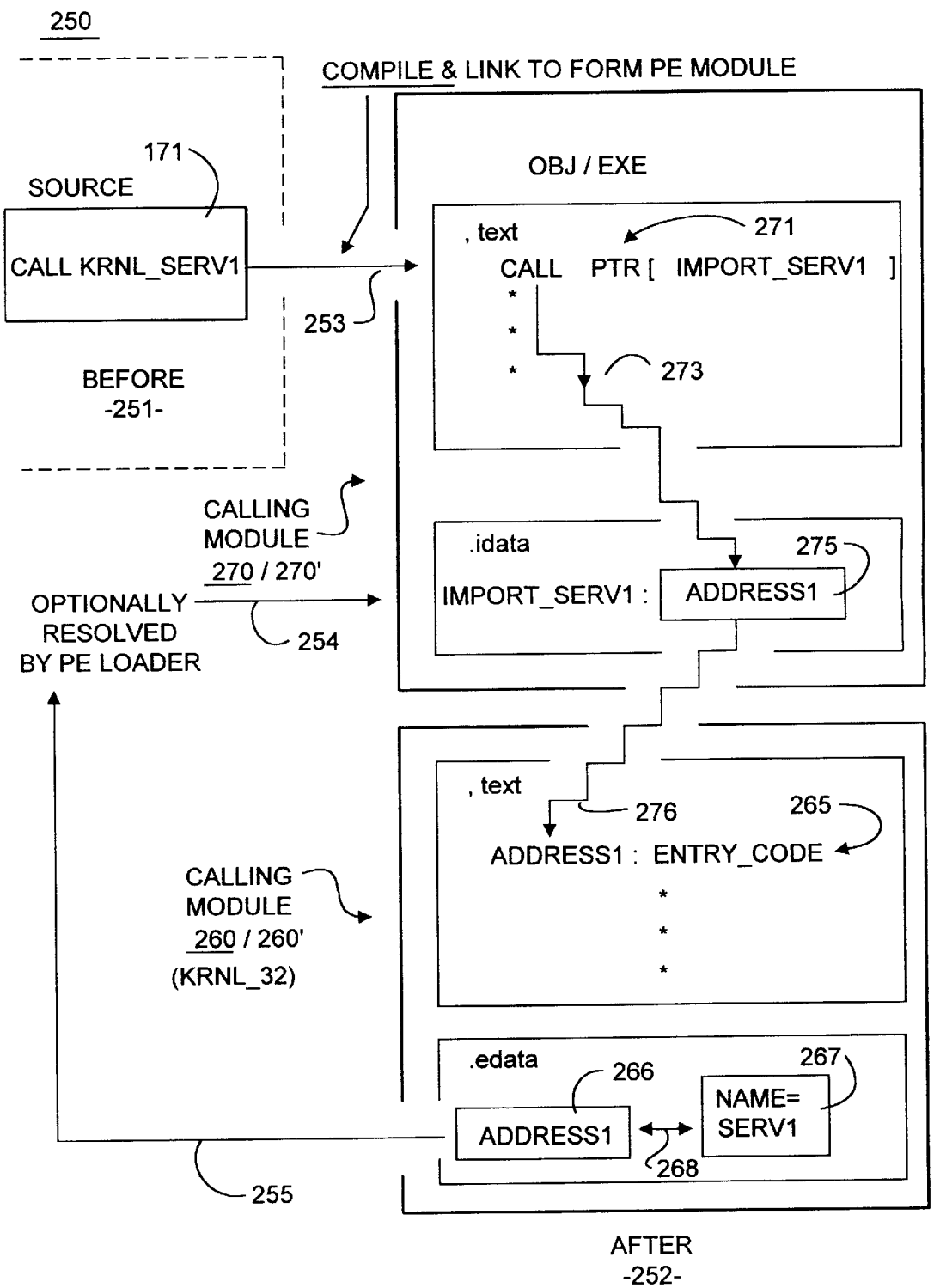
FIG. 2B is a diagram set forth in terms of time versus data-structure for showing how a source code call to a service routine of an external module is converted into an executable indirect call instruction within system memory.

Referring now to FIG. 2B, there will be described one particular mechanism (but not an exclusive mechanism) by which a first PE module can import services from an external, second PE module.

FIG. 2B shows a diagram 250 that contains both chronological and data structure portions. Diagram 250 has a 'before' part 251 and an 'after' part 252.

As shown in the 'before' part 251, the source version of the calling PE module (e.g., module 170 as it originally appears to the software developer when that developer is writing the source code of module 170) has a yet-not-resolved reference to a kernel service named 'KRNL_SERV1'.

At step 253, the source code 'CALL KRNL_SERV1' is compiled and linked to form part of a disk-image 270 of the calling PE module.

In the process of carrying out step 253, the direct call 'CALL KRNL_SERV1' is converted into an indirect call 'CALL PTR[IMPORT_SERV1]' as shown at 271.

The indirect call instruction 271 ends up residing in the .text section of the calling PE module 270/270'. (The non-apostrophized notation 270 is used for referencing the disk-image of the calling module while the apostrophized notation 270' designates a corresponding RAM-resident image. The combined notation 270/270' indicates that the statement applies to both the disk-image and the RAM-resident image.)

Within the compile/link step 253, a redirecting structure 275 is created for the location defined by the indirect pointer value, IMPORT_SERV1. The redirecting structure 275 ends up residing in the idata section of the calling PE module 270/270'.

A 'valid' vector value such as 'ADDRESS1' may or may not be already stored within the redirecting structure 275 at the time the compile/link step 253 completes (and the static, disk-image 270 of the calling PE module is formed).

If a valid vector value such as 'ADDRESS1' is already stored within the redirecting structure 275/275', flags will have been set inside the .idata section of the calling PE module 270/270' to indicate that the vector stored inside redirecting structure 275/275' is a valid vector value. If not, the linking-loader (e.g., 174) may insert an appropriate vector value into the RAM-resident version of redirecting structure 275' at the time it uploads the calling PE module 270 into system memory 140 and the linking-loader will at that time set the valid flags.

Upload-time definition of a yet-not resolved vector value (e.g., 'ADDRESS1') proceeds in general as follows. More details will be given when we get to FIG. 2A.

The called module 260' has the correct value for 'ADDRESS1' pre-stored in its .edata section as indicated at 266. A corresponding service name such as 'SERV1' is also pre-stored in the .edata section of the called module 260' as indicated at 267. One or more pointers within the .edata section of the called module 260' cross reference item 266 to item 267 as indicated at 268. (The service name 'SERV1' is understood to correspond to 'KRNL_SERV1' because item 267 resides in this example in the KRNL_32 module.)

The linking-loader obtains the service name 'SERV1'. It goes to the export data section (.edata) of the called module 260' and follows the pointers 268 to find corresponding item 266. The linking-loader then takes the 'ADDRESS1' value stored at 266 and copies it, as indicated by arrows 255 and 254, into the redirecting structure 275.

When the indirect call instruction at 271, 'CALL PTR [IMPORT_SERV1]' is later executed after module 270' is launched for execution, execution control transfers through the redirecting structure 275 as indicated by arrow 273 to the code entry location 265 ('ADDRESS1') of the requested service 'KRNL_SERV1' as further indicated by arrow 276.

Referring now to FIG. 2A, some additional details of the upload resolving procedure 200 which is followed by a PE loader (174') are explained.

Procedure 200 begins at step 201. The linking-loader is assumed to be in the process of scanning through the .idata section of a then uploading module 270/270'. The linking-loader is assumed to have just come across a redirecting structure such as 275 of FIG. 2B. This redirecting structure 275 (FIG. 2B) is stored in an import data section (.idata) that has been created for connecting to the called external module 260' (e.g., to the OS kernel). The redirecting structure 275 can reference the desired outside service either by name (e.g., 'SERV1') or by an associated ordinal number.

At step 202, the linking-loader looks within system memory 140 for the export array (.edata) of the called module 260'.

If the export array (.edata) of the called module 260' is not yet RAM-resident, control passes to step 204 where the linking-loader iteratively calls itself and tries to upload the called module 260'. If successful it returns to step 202.

Once step 202 concludes with a finding of the external module's export array, the algorithm 200 continues along path 203 to step 205.

At step 205 the import record (.idata) of the calling PE module 270' is accessed and tested to see if the redirecting structure 275 is already filled with a valid vector value (e.g., 'ADDRESS1'). To be valid, the corresponding entry in the redirecting structure 275 should simultaneously satisfy the following three criteria: (1) flags are set to indicate that the current calling module 270 was statically linked with respect to this vector value (e.g., 'ADDRESS1'); AND (2) the external, called module 270' was uploaded to its preferred base address 194' (see FIG. 1B); AND (3) the export array (.edata) of the called module 260' has a time/date stamp matching the Date_Stamp of the current import entry (.idata) of the calling module 270/270'.

If at step 205 it is determined that the redirecting structure 275/275' already contains a valid vector value (all three conditions are true), then the redirecting structure 275 is left as is, and procedure 200 completes through bypass path 206 and exit step 215.

When bypass path 206 is taken, procedure 200 avoids wasting time performing next-described steps 208–210 and load time is thus advantageously reduced.

Bypass path 206 is typically taken in the case where the compiler or linker has previously 'bound' the disk-image 270 of the calling module to a specific version of the called module 260' (e.g., to a specific version of OS kernel 134 and/or to specific versions of prespecified procedure libraries). The advantage of such 'binding' is that the linkage validating procedure 200 does not have to waste time performing next-described steps 208–210.

If, on the other hand, it is determined at step 205 that the redirecting structure 275/275' does not contain a valid vector value (because for example, there is a mismatch in date stamp values), control passes by way of the condition-false path 207 to step 208.

At step 208, the export array (.edata) of the called module 260' is searched for a service name (or a corresponding ordinal number) matching the service name (or ordinal number) requested by the calling PE module 270/270'. If there is none, an exception is taken by way of path 209 and error handling routine 219.

Once found, the matching service name (or ordinal number) in the export array (.edata) of the called module 260' is used to navigate to a location 266 (FIG. 2B) storing the correct vector value (e.g., 'ADDRESS1'). The vector value of location 266 is fetched.

At next step 210, the fetched vector value is written into redirecting structure 275. Then the flags of the redirecting structure 275 are set to indicate that structure 275 now contains a valid vector value. The flag setting substep includes stamping the redirecting structure 275 with date/time and base address stamps matching those of the called external module 260'. Thereafter, procedure 200 exists through step 215.

Returning briefly to FIG. 1A, it is noted that validated linkages from calling module 170' to external services (e.g., SERV1, SERV2) of modules 134 and 136 are respectively indicated by dashed connections 181 and 182. The validated linkages 181, 182 can come into being as a result of actions taken by the linking-loader (e.g., 174) at upload-time or as a result of earlier 'binding' actions taken by the compiler or PE module linker.

Each additional PE module that is uploaded into system memory 140 after application program APP_#M is link-loaded into memory, will have its own private import data section (.idata) and that private import data section will be independently filled in either dynamically by the PE loader 174 at load time or statically by the compiler or linker respectively at a previous compile-time or link-time.

Given the above, the problem of subclassing in this kind of environment should now be more readily understandable.

Calls to services within the OS kernel 134 or to services within another module (e.g., 138) are made indirectly through module private redirecting structures such as 275 (FIG. 2B). There are many such private redirecting structures scattered about private Wind32 process area 142 and/or shareable user space 144. The locations of these scattered redirecting structures (e.g., 275) can change over time as respective modules are dynamically uploaded into and unloaded from system memory 140. There is no globally-constant Interrupt Vector Table (IVT) or other fixed API area through which calls to services in the OS kernel are routinely made.

So how does one go about subclassing the OS kernel 134 (or another like dynamically-link loaded module?

The answer requires a yet deeper understanding of how the export array (.edata) of each service-exporting module operates.

Figure 3A:
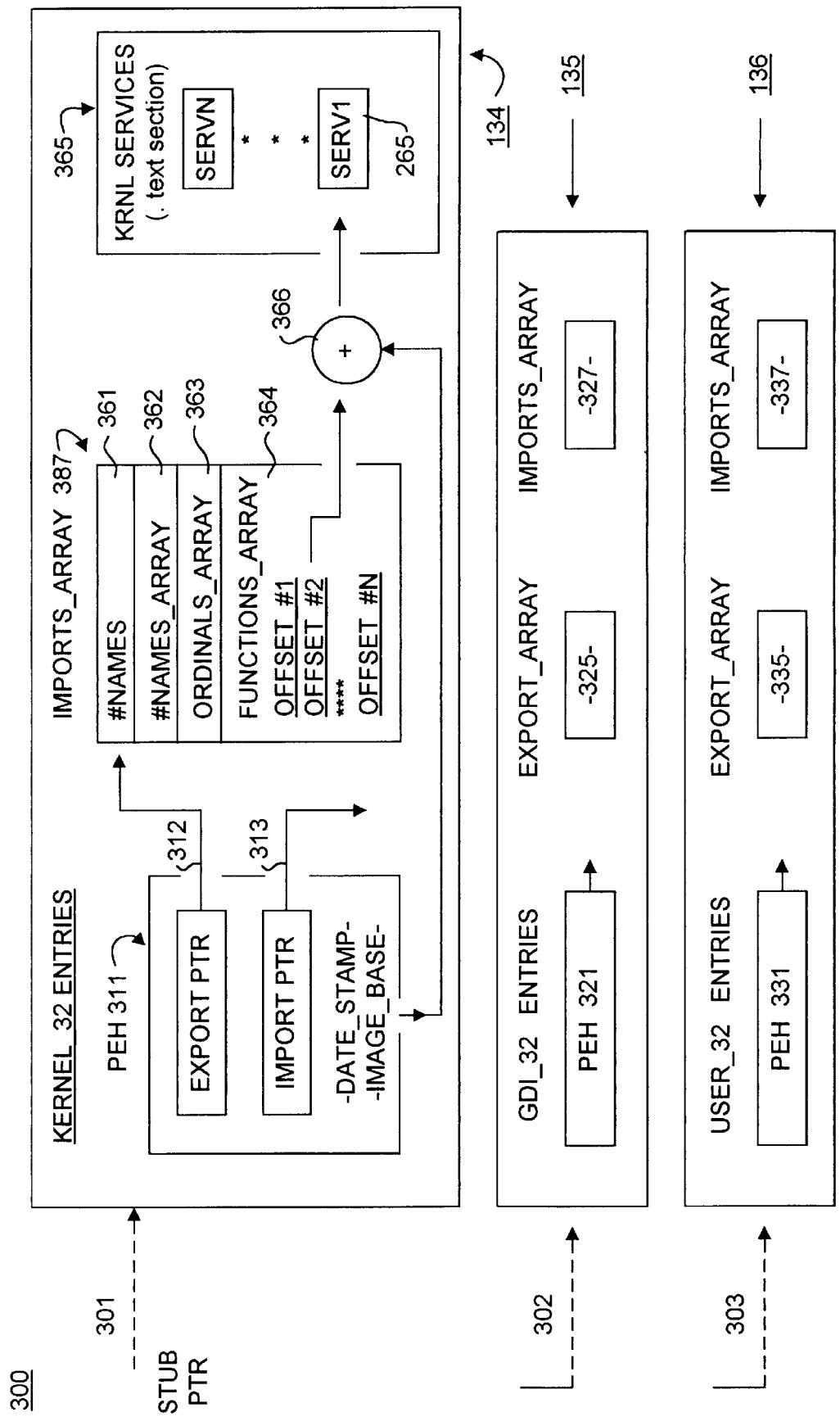
FIGS. 3 and 3B combine to show the cooperation between the export array of the OS kernel and the imports arrays of Win32-compliant user modules that call on services of the OS kernel.
Figure 3B:
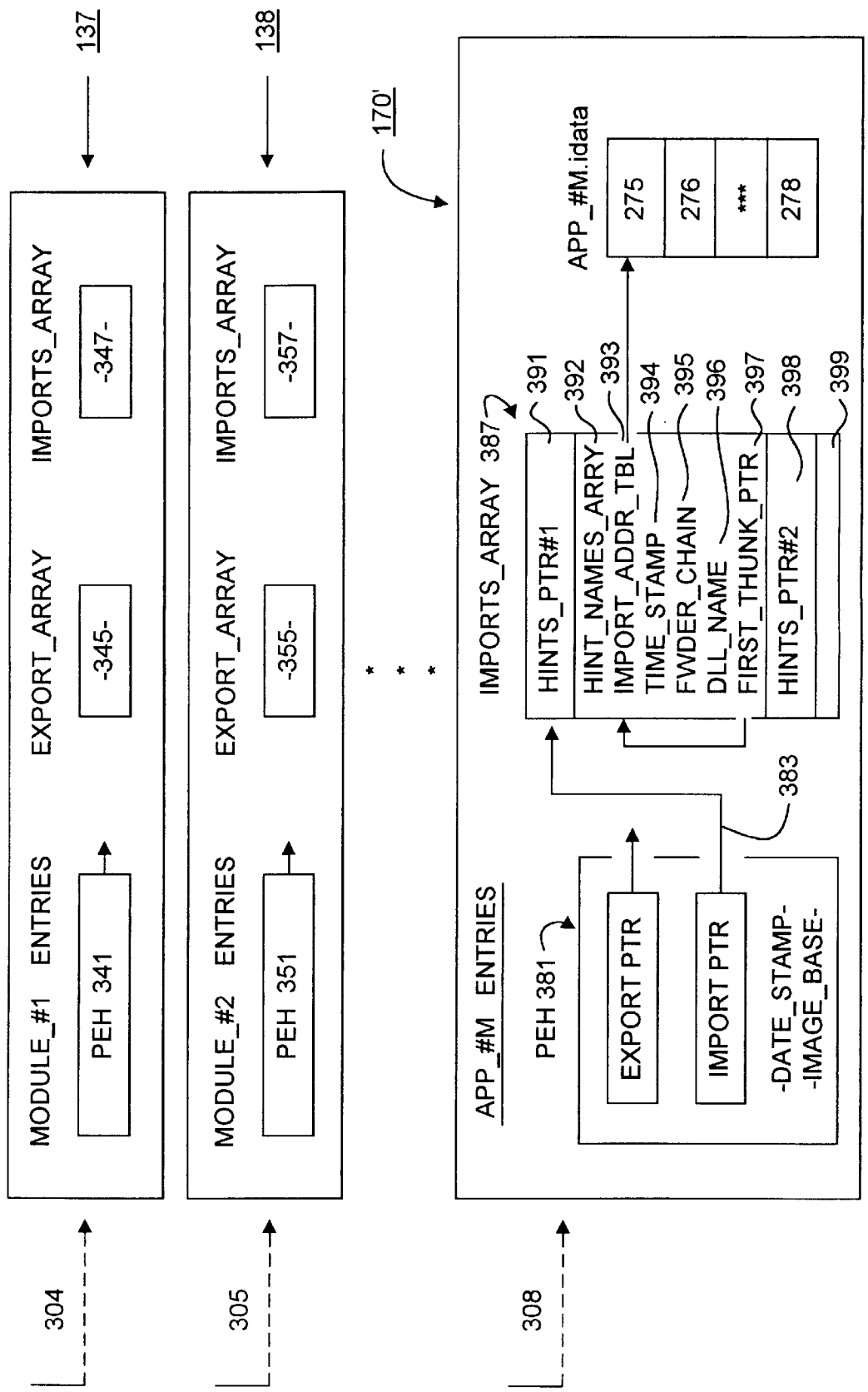

Referring to the combination of FIGS. 3A and 3B, a closer look is now taken at the structures found in system memory 140 after completion of the link loading of OS kernel 134, of GDI module 135, of USER module 136, of PE_MOD1 module 137, of PE_MOD2 module 138, of PE_MODn module 139 and of application program APP_#M (module 170').

The KRNL_32 module 134 is the first one normally loaded into the shared user space 144. Because all of the shareable user space 144 is free at that time, the preferred upload-destination address (Image_Base) of the OS kernel 134 will usually be honored by the then executing loader (which is not the PE loader 174 found inside of the disk-image of the not yet fully loaded KRNL_32 module 134).

The DOS_header (not shown) of the RAM-resident KRNL_32 module 134 will have a stub pointer 301 (previously shown in FIG. 1B as the 'PE_Header_Ptr') pointing to the beginning of its real PE header 311 (PEH 311). This real PE header 311 will contain an export pointer 312 pointing to the corresponding export array 315 of the kernel. The real PE header 311 may also contain an import pointer 313 pointing to the imports array (not shown) of the KRNL_32 module 134. The kernel PE header 311 will also include a DATE_STAMP and an IMAGE_BASE value.

The main body portion (193) of KRNL_32 module 134 will include an exportable services area 365 (KRNL/.text) containing exportable services such as 'SERV1' which has an entry point at address 265.

After various data items such as 311, 315 and 365 of KRNL_32 module 134 have been plastered into system memory 140 by the OS loader, the additional global modules such as the GDI module 135 and the PE_MOD1 module 137 are loaded into shareable user space 144 using the RAM-resident PE loader 174' included in KRNL_32 module 134.

And as seen in FIG. 3B, further modules such as PE_MOD1 module 137 and PE_MOD2 module 138 are thereafter loaded into the shared user space 142 by the kernel's PE loader 174' and yet more modules such as application program module 170' are loaded into the private Wind32 process area 142. Each such loaded module has a respective, real PE header (321, 331, 341, 351, 381) and corresponding pointed-to export and import arrays (325, 335, 345, 355, 385 and 327, 337, 347, 357, 387).

Referring in more detail to the export array 315 of the KRNL_32 module 134, one sees a variety of finer structures contained therein. At the top of export array 315 there is a first field 361 (#NAMES) indicating the number of service names or aliases to be found in a following NAMES_ARRAY 362. Service names within the NAMES_ARRAY 362 are ordered in the same way as ordinal values are ordered within a following ORDINALS_ARRAY 363.

The entries within the ORDINALS_ARRAY 363 point to offset values (OFFSET_#1, OFFSET_#2, . . . OFFSET_#N), stored in a FUNCTIONS_ARRAY 364. The offsets of FUNCTIONS_ARRAY 364 are defined as values relative to the base of the KRNL_32 module 134.

Since the KRNL_32 module is the first one loaded into shared user space 144, the disk version of the kernel's IMAGE_BASE (as well as the memory version of the kernel's IMAGE_BASE) will generally point to the actual base location of the RAM-resident KRNL_32 module 134. (To locate the base of other, later loaded modules, one may use a GetModuleHandle procedure of the Wind32 operating system.)

The virtual address of the entry point (e.g. 265) to a desired service (e.g., 'SERV1') is obtained as indicated at 366 by taking a corresponding offset value (e.g., OFFSET_#2) in the FUNCTIONS_ARRAY 364, and adding the kernel's IMAGE_BASE value to that offset value.

Step 208 of FIG. 2A uses a corresponding algorithm to get the address (e.g., 'ADDRESS1') of a desired external service prior to writing it in step 210 into the import array of the calling module 270'. If the ordinal number is not known and only a service name is available, the NAMES_ARRAY 362 is searched for a match. The amount of indexing taken down NAMES_ARRAY 362 to find the matching service name is retained and the same index is used to fetch the corresponding ordinal number from the ORDINALS_ARRAY 363. The fetched or already-known ordinal number is used to point to the corresponding offset value (e.g., OFFSET_#2) in the FUNCTIONS_ARRAY 364. That offset value is obtained, and the IMAGE_BASE value of the called module 260' (e.g., OS kernel 134) is added to the obtained offset value. The sum is thereafter inserted at step 210 into the redirecting structure 275 of the calling module 270.

Figure 4:
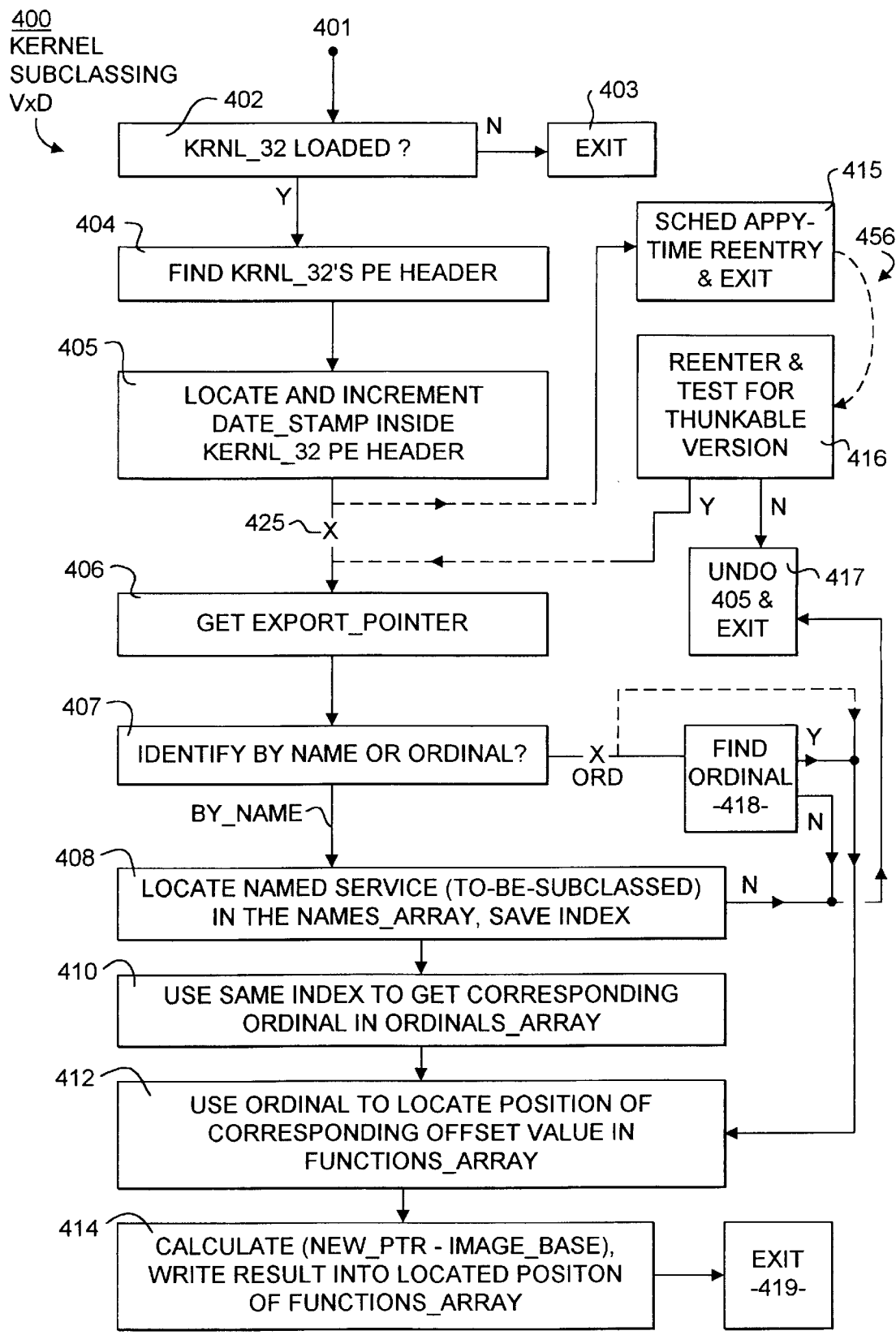
FIG. 4 is a flow chart showing how the export record of the operating system kernel may be modified in accordance with the invention by a virtual device driver (VxD) to globally redirect operating system service calls to new addresses.

FIG. 4 shows how the above information is exploited in accordance with the invention to produce a kernel subclassing procedure 400. Procedure 400 may be initially in the form of pre-compiled code stored on a data-conveying device 130 such a floppy diskette or a CD ROM or magnetic tape. This pre-compiled data of the data-conveying device is targeted for execution by the CPU 120 of system 100. The operating system files on disk subsystem 150 are supplemented by adding to them the code of algorithm 400 from the data-conveying device. In one embodiment, the supplementing step is carried out by defining the added code of algorithm 400 as a virtual device driver (VxD) that is to loaded together with other VxD's into the privileged space 145 of system memory by the OS loader program 153 during system boot-up.

Before examining the details of algorithm 400, let us return briefly to FIG. 1A to note the following. Before the KRNL_32 module 134 is loaded into system memory 140, the OS loader program 153 will have already loaded the virtual machine manager (VMM) and its associated virtual device drivers (VxD's) from disk subsystem 150 into privileged space 145. The kernel subclassing procedure 400 can be pre-stored on the disk subsystem 150 to serve as one of these virtual device drivers (VxD's). When the OS loader program 153 completes the uploading of the KRNL_32 module 134, the virtual machine manager (VMM) sends a corresponding status message, KRNL_INIT, to its VxD's. The kernel subclassing procedure 400 sits in wait for this message.

Algorithm 400 is entered at node 401. At node 402 the system status is tested to see if an indication has been received from the VMM (Virtual Machine Manager) that the KRNL_32 module 134 has been loaded into system memory. If no (N), an exit is taken through step 403. Node 401 is re-entered the next time the VMM broadcasts a new system status message.

(As an aside, it should be noted that although the illustrated kernel subclassing procedure 400 is directed to the subclassing of KRNL_32 module 134, the same principles can be applied to the sublassing of other modules, and appropriate parenthetical comments regarding this will be made along the way as we proceed through algorithm 400. Steps 401–403 may be generalized as a step of waiting for completion of the uploading of the to-be subclassed module.)

If the answer to test 402 is yes (Y), soon thereafter, before any additional modules have a chance to load, algorithm 400 proceeds to step 404 where it finds the real PE header of the just loaded KRNL_32 module. The real PE header 311 (FIG. 3A) is found using the Image_Base value stored in the disk-image 154 of the kernel to determine the base location 194 of the kernel's RAM-resident image. Then the PE_Header_Ptr 301 is located and used to locate the base of the real PE header 311.

(In the case where the to-be subclassed module is a module loaded after kernel 134 rather than kernel 134 itself, the base location 194 of that other to-be subclassed module may be obtained using the GetModuleHandle procedure. The PE_Header_Ptr in the DOS_header 191 may be followed to locate the corresponding real PE header 192 of the to-be subclassed module.)

At step 405, the DATE_STAMP inside the kernel's real PE header 311 (or inside the real PE header of the other to-be subclassed module) is found and incremented or decremented by an unlikely value such as one second.

This is done so as to force later-executing, linkage-verifying procedures such as 200 of FIG. 2A to a conclusion that there is a date/time mismatch (see step 205) and that the vector value currently stored in the redirecting structure 275 under consideration is not valid.

The incrementing or decrementing of the original date stamp in step 405 by a value such as 1 second creates a new date stamp value. Because new versions of an OS kernel or other modules are rarely created just a few seconds apart, there is a close-to-nil chance that the new date stamp value created in step 405 will match the value of a date stamp in a pre-thunked version of a real OS kernel or other to-be subclassed module.

When a later-executing, linkage-verifying procedure (e.g., 200) looks at the new date stamp value created in step 405, the linkage-verifying procedure (e.g., 200) will conclude that the local import value it is trying to verify is invalid.

The linkage-verifying procedure will then access the export array of the OS kernel (or of the other to-be subclassed module) and use the corresponding offset value (e.g., OFFSET_#2) then stored in the FUNCTIONS_ARRAY (e.g., 364) to calculate the address of the external service and to store that calculated address value in the redirecting structure 275 then being considered.

So in procedure 200 (FIG. 2A) for example, step 205 will be forced to take the no (N) path 207 to steps 208–210. The new offset value that will have been previously created at below-described step 414 of procedure 400 will be used to forcibly insert a predefined subclassing address into the local redirecting structure 275 then under consideration.

The date stamp modifying step 405 can be carried out anywhere in algorithm 400 after step 404, and it may make more sense to first consider step 405 as being carried out after step 414.

The reason step 405 is preferably carried out so early in algorithm 400 is mainly for safety, to lessen the chance that other modules will be statically linked to the kernel 134 by the loading operations of the OS loader program 153. If the OS loader program 153 is trying to upload other modules into system memory 140 at the same time that the kernel is loaded or initialized, the early alteration in step 405 of the kernel's date stamp should at least force the OS loader program 153 to dynamically-link any cross-referencing other module to the kernel 134 rather than allowing static-linking. A trap may be established in the OS loader program 153 to block dynamic linking of other modules to the kernel until after below-described step 414 is executed.

In general, algorithm 400 may next proceed sequentially through steps 406 through 419 and that is the path generally taken if the to-be subclassed module is one loaded after KRNL_32 module 134.

However, if the to-be subclassed module is the kernel itself, it should be recognized that the KRNL_32 module 134 is usually not being loaded by a PE loader such as 174 but rather by the OS loader program 153. The OS loader program 153 may allow some unpredictable things to occur during the loading and/or initialization of the KRNL_32 module 134. As a safeguard against such unpredictable events, an optional detour may be taken as indicated by the 'X' at 425, through steps 415 and 416.

Step 415 schedules a later-in time re-entry into step 416 and then exits.

The scheduled time of re-entry into step 416 is preferably a so-called 'APPY-time'. The start of 'APPY-time' is signalled by the OS loader program 153 to the virtual machine manager (VMM) when the OS loader program 153 has finished loading the more vital parts of the OS environment. 'APPY-time' is sort of a play on words and can be considered as an 'application happy-time' in which algorithms such as 400 can complete their tasks more safely than they could have prior to 'APPY-time'. APPY-time is a time period when Win16 modules and the Win16 API are known to have been already loaded into system memory. The Win16 API can be consulted to determine what specific version of Wind32 is present within the system.

There is a certain time delay between steps 415 and 416 as indicated by dashed path 456, and then during 'APPY-time' step 416 is entered.

For simplicity, we have delayed mentioning that algorithm 400—by itself—does not necessarily work on all different kinds of Wind32 kernels. Some operating systems such as the 'Debug version' of Windows95™ contain kernel-protecting mechanisms that block further OS operations if the OS kernel is modified and/or prevent errant code from modifying the OS kernel in any way. In such kernel-protecting environments, the below-described kernel-modifying step 414 will not be allowed to take hold. If one wished to employ the basic principles of algorithm 400 in a kernel-protecting environment such as that of the 'Debug version' of Windows95™, one would have to add some sort of bypass to the kernel-protecting mechanism so as to allow kernel-modifying step 414 to take hold. At the time of this writing, a specific bypass for the kernel-protecting mechanisms of the 'Debug version' of Windows95™ has not been devised.

In view of this, step 416 looks about the operating system environment during the 'APPY-time' period to see (by consulting with the Win16 API) if the currently loaded Wind32 kernel is a 'thunkable' type as is the first commercial, non-Debug version of Windows95™ or if the currently loaded Wind32 kernel is a 'non-thunkable' protected type as is the case for the 'Debug version' of Windows95™.

If the answer at step 416 is no (N), meaning that the currently loaded OS kernel 134 is not a known 'thunkable' type, control passes to step 417 where the time stamp modification of step 405 is undone and algorithm 400 terminates.

If the answer at step 416 is yes (Y), algorithm 400 continues on into step 406. As mentioned, step 406 can be alternatively entered directly from step 405.

In step 406, the export pointer (e.g., 312) of the to-be subclassed module's PE header (311) is located and used to navigate to the module's export array (315).

The service that is to-be subclassed can be identified by a service name or by a corresponding ordinal number. Step 407 determines which form of identification is being used.

If the answer at step 407 is by ordinal number (ORD), control passes to step 412. An optional test 418 may be first performed to make sure the given ordinal number exists in the ORDINALS_ARRAY (363). If the given ordinal number does not exist in the ORDINALS_ARRAY, then an exit should be made through step 417.

If the answer at step 407 is by service name (BY_NAME), control next passes to step 408. The NAMES_ARRAY (362) of the to-be subclassed module is searched for a match. If no match is found, an exit should be made through step 417.

If a match is found, the index is saved and next used at step 410 to get the corresponding ordinal number in the ORDINALS_ARRAY (363).

At the following step 412, the ordinal number is used to locate the position of the corresponding offset value (e.g., OFFSET_#2) in the FUNCTIONS_ARRAY 364. If needed for later processing, the corresponding offset value (e.g., OFFSET_#2) should be now saved.

At next step 414, a substitute offset value is calculated as being equal to the desired new subclassing address (NEW_PTR) minus the base location address 194 (Image_Base) of the service-exporting module (e.g., KRNL_32 module 134) that is now being subclassed. This substitute offset value is then written into the located position in the FUNCTIONS_ARRAY that was occupied by the original offset value (e.g., OFFSET_#2).

Algorithm 400 now completes through exit step 419.

After algorithm 400 completes, later-uploadings of PE modules will be forced to flow through steps 208–210 of procedure 200 (or through like steps in other linkage verifying procedures). At step 208 (FIG. 2A), the substitute offset value will be found in the FUNCTIONS_ARRAY of the now-subclassed, external module (e.g., KRNL_32 module 134), the base address value (194) of the now-subclassed, external module will be added to this substitute offset value as indicated by 366 of FIG. 3A and the result value (NEW_PTR) will be copied into the redirecting structure 275 of the calling PE module 270' whose import data section (.idata) is being verified.

Thus, in the case where an application program module such as 170' of FIG. 3B is dynamically uploaded into system memory after kernel thunking step 414 has been carried out, the local imports array 387 of module 170' will have the result value (NEW_PTR) copied into its corresponding redirecting structure 275 at the time of dynamic uploading instead of the original service address (e.g., 265) of the OS kernel 134. The same thing will happen for every other module that is uploaded after the kernel has been thunked by algorithm 400.

(The various detailed structures such as 391 through 399 within the local Imports_Array 387 are not directly relevant to the workings of algorithm 400 and are shown primarily as a road map for those familiar with the details of the imports array within a PE module. Import_Address_Table 393 is used to find the corresponding redirecting structure such as 275, 276, . . . , 278 of an importable service name found in corresponding Hint_Names_Array 392. Time stamp 394 is the entity that is compared against the DATE_STAMP of the external module to validate the vectors stored in Import_Address_Table 393. Other import structures that rely on a Time_Stamp such as 394 and a redirecting structures such as 275, 276, . . . , 278 will also work with algorithm 400.)

If instead of using the local module's Imports_Array 387, the GetProcAddress or a similar dynamic-access procedure is used after the kernel has been thunked by algorithm 400, where the dynamic-access procedure dynamically accesses at run-time a named kernel service (or a service of another similarly subclassed module), the new pointer value (NEW_PTR) will be similarly obtained by the dynamic-access procedure instead of the original service address (e.g., 265) of the thunked kernel or other-module.

In one embodiment, the new subclassing pointer (NEW_PTR) points to a substitute general dispatcher that is to be used in place of the kernels original dispatcher.

While the above discussion was primarily directed to the subclassing of the KERNEL_32 module 134, the same principles can be applied to provide subclassing for any other PE-formatted or like module as long as all modules which make external calls to the subclassed module are loaded after the export array of the subclassed module has been thunked.

The new routine that is invoked due to the subclassing can provide a variety of useful functions. For example, if calls to the application program launching services of the OS kernel are first redirected by subclassing to a virus detecting/blocking routine before allowing launching of the requested application program, protection against undesirable virus infection may be provided within a Wind32 or like environment. The virus detecting/blocking routine would scan each to-be launched program before allowing it to launch. The virus detecting/blocking routine would block launching and/or flash a warning and/or take other corrective action if the signature of a virus is detected.

By way of further example, a global snooping routine could be subclassed onto a particular service of the OS kernel to detect all application programs that call on that service. After detection and history collection, each of the calling application programs can be fine-tuned such that each makes more efficient use of the called kernel service based on the calling history of that application program.

By way of yet further example, if application program launching requests to the OS kernel are first redirected by subclassing to a license policy enforcing program, site licensing and/or other application program controlling programs can be invoked to make sure a predefined license policy is not being violated (e.g., too many users on a LAN are trying to launch the licensed application program at the same time in violation of the policy.). If the policy is about to be violated by the requested launching, the launching can be automatically blocked and an appropriate message can be instead sent back to the user.

By way of yet a further example, the operating system may be modified to allow a user to maintain two or more virtual desktops each having a unique state. The application program launching services of the OS kernel are subclassed to redirect control, after each application program of a given 'virtual' desktop is launched, to a launch-history recording program. The launch-history recording program keeps track of what application programs were launched in each. 'virtual' desktop and what their specific launching parameters were. The state of each virtual desktop can be preserved in memory (preferably in nonvolatile memory) prior to letting the OS exit from a given desktop.

When a user later tries to relaunch the same 'virtual' desktop, the subclassed desktop launching service of the OS kernel is redirected by subclassing to a desktop-state restoring program that automatically relaunches all the application programs that were earlier launched in the given 'virtual' desktop, with each relaunching using the specific launching parameters that were earlier recorded by the launch-history recording program. Thus, a user can be made to believe through such desktop record and restore mechanisms, that he or she has many virtual desktops between which he or she may hop. The user can be made to believe through such desktop record and restore mechanisms, that the state of each virtual desktop remains preserved between visits to that desktop.

The above disclosure is to be taken as illustrative of the invention, not as limiting its scope or spirit. Numerous modifications and variations will become apparent to those skilled in the art after studying the above disclosure. As explained above, although kernel subclassing has some unique peculiarities, the same general principles may be applied for subclassing the services of other modules that use structures such as an export data section (.edata) to enable the dynamic exporting of their services. The subclassing algorithm (e.g., 400) may be first embodied as machine-readable code stored on a data conveying means such as a floppy diskette or CD ROM, the stored code being for execution by a predefined CPU or other like data processing means. Execution of the subclassing algorithm (e.g., 400) on the target platform 100 may be forced by a variety of means, the use of the VxD mechanism is just an example. The basic approach is to wait for the loading or other installation or activation of at least the export data section of the to-be subclassed module and to then appropriately thunk the export data section before that export data section becomes further usable for dynamic-linking of other modules to the to-be subclassed module.

Given the above disclosure of general concepts and specific embodiments, the scope of protection sought is to be defined by the claims appended hereto.

What is claimed is:

1. A method of subclassing a pre-identified dynamically-exportable service of a pre-identified software module wherein the pre-identified software module includes an export data section that is usable for dynamic-linking of other software modules to the pre-identified dynamically-exportable service of the pre-identified software module, said method comprising the steps of:

(a) waiting for installation of at least the export data section of the pre-identified software module; and (b) before said other modules are linked to the pre-identified software module, modifying the installed export data section of the pre-identified software module so as to enable linking of the other modules by way of the modified export data section to a subclassing routine, said modification of the installed export data section including the substeps of:
(b.1) locating in the installed export data section, the position of an original value normally used for referencing said pre-identified dynamically-exportable service during dynamic linking; and
(b.2) overwriting the located position of said original value with a different value that redirects control to the subclassing routine.

2. A subclassing method according to claim 1 wherein said method further comprises:
(c) before said other modules are linked to the pre-identified software module, further modifying the pre-identified software module so as to force linking of the other modules to the subclassing routine by way of the modified export data section, and
wherein said step of further modifying so as to force linking of the other modules to the subclassing routine includes:
(c.1) altering a time stamp of the pre-identified software module.

3. The subclassing method of claim 2 wherein said step (c) of further modifying is carried out before said step (b) of modifying the installed export data section.

4. The subclassing method of claim 2 wherein said step (c.1) of altering the time stamp includes:
(c.1a) incrementing or decrementing the time stamp of the pre-identified software module by a small value that is unlikely as a time difference between different versions of the pre-identified software module.

5. The subclassing method of claim 3 wherein said operating system is loaded by an OS loader program and said subclassing method further comprises, between said step (c) of further modifying and said step (b) of modifying the installed export data section, an additional step of:
(d) waiting for a signal from the OS loader program indicating that at least API parts of the operating system have been loaded.

6. The subclassing method of claim 1 wherein the pre-identified dynamically-exportable service can be identified by a service name or by a corresponding ordinal number and said subclassing method further comprises the step of:
(d) determining which form of identification is being used to pre-identify the dynamically-exportable service; and further wherein:
(b.1a) said step (b.1) of locating the position of the original value is responsive to said step (d) of determining which form of identification is being used.

7. The subclassing method of claim 1 wherein said pre-identified software module is a dynamically-linked kernel of an operating system that further includes a virtual machine manager (VMM) and said step of (a) waiting for installation includes:
(a.1) testing system status messages broadcast by the VMM for a system status message that indicates the that the dynamically-linked kernel has been loaded into system memory.

8. A method for subclassing a pre-identified exportable service of a pre-identified portable-executable (PE) module that uploads into system memory, said method comprising the steps of:

(a) after the pre-identified PE module has been loaded into system memory but before other modules are loaded into system memory, said other modules being ones that may use said pre-identified service, locating the PE header of the pre-identified PE module;
(b) obtaining from the located PE header an export pointer that points to an export array of the pre-identified PE module;
(c) locating in the export array of the pre-identified PE module, the position of an original value normally used for referencing said pre-identified service;
(d) overwriting the located position of said original value with a new value equal to a desired subclassing address minus an image base value of the pre-identified module that is being subclassed.

9. A machine-implemented system for subclassing an exportable service of a first loaded module with respect to afterwards-loaded service-importing modules, wherein the first module has a relatively-locatable export record that may be used for resolving external links during a uploading into system memory of one or more of the service-importing modules, said system comprising:
(a) detecting means for detecting completion of the loading of the first module into system memory;
(b) locating means for locating the relatively-locatable export record of the first module and for locating a vectoring position of said service within the located export record;
(c) thunking means for writing a redirecting value into the located vectoring position of the first module after the first module is loaded, the redirecting value redirecting to a predefined subclassing address, those external links that are later resolved during the loading of one or more of the service-importing modules; and
(d) forcing means for forcing use of the thunked export record of the first module during subsequent uploading into system memory of the one or more of the service-importing modules.

10. A machine-implemented desktop-restoring method for use with an operating system (OS) kernel that provides for dynamic-linking-to of kernel services from dynamically-linked loadable modules, said desktop-recreating method comprising the steps of:
(a) globally redirecting by subclassing of one or more of the dynamically-linked-to services of said OS kernel, file launching requests made to the OS kernel for files to be launched on a given virtual desktop, said redirecting being to a launch-history recording program that executes after the file launching request is serviced, said launch-history recording program being for recording the state of the given virtual desktop after the file launching request has been serviced; and
(b) using the recorded information produced by said launch-history recording program to later restore the given virtual desktop in the state the virtual desktop had at the time of the last execution of said launch-history recording program.

11. A data conveying apparatus having subclassing code defined therein for execution by a predefined code executing unit, the subclassing code being for subclassing a dynamically-exportable service of a first software module wherein the first software module includes a header section and an export data section that are usable for dynamic-linking of other software modules to the dynamically-exportable service of the first software module, said subclassing code comprising:

(a) waiting means for waiting for installation of at least the header section and the export data section of the first software module; and (b) modifying means, responsive to the waiting means, for modifying the installed export data section and the installed header section of the first software module so as to force linking of the other modules by way of the modified export data section to a subclassing routine instead of to the dynamically-exportable service.

12. A data conveying apparatus according to claim 11 wherein said modifying means includes:

(b.1) locating means for locating in the installed export data section, the position of an original value normally used for referencing said dynamically-exportable service during dynamic linking;

(b.2) overwriting means for overwriting the located position of said original value with a different value that redirects control to the subclassing routine.

13. A method of subclassing one or more dynamically-exportable services of a pre-identified software module globally relative to later-dynamically-loaded modules, wherein the pre-identified software module includes an export data section that is usable for dynamic-linking of other software modules to dynamically-exportable services of the pre-identified software module, said method comprising the steps of:

(a) modifying the export data section of the pre-identified software module so as to enable dynamic linking of the other modules by way of the modified export data section to a subclassing routine instead of to a corresponding one of the one or more to-be-subclassed, dynamically-exportable services, said modification of the installed export data section including the substeps of:

(a.1) locating in the installed export data section, a position used for referencing a corresponding one of the one or more to-be-subclassed, dynamically-exportable services during dynamic linking; and (a.2) writing into the located position a new value that redirects control to the subclassing routine.

14. The subclassing method of claim 13 further comprising the step of:

(c) further modifying the pre-identified software module so as to force linking of said later-dynamically-loaded modules to the subclassing routine by way of the modified export data section.

15. The subclassing method of claim 13 wherein at least one of the later-dynamically-loaded modules is one whose specific identity is not known prior to run time.

16. A method of subclassing one or more pre-identified dynamically-exportable services of a pre-identified software module wherein the pre-identified software module includes an export data section that is usable by a dynamic loader for run time dynamic-linking of other software modules to dynamically-exportable services of the pre-identified software module, said method comprising the step of:

(a) writing into the export data section, a new vector value at a vector-storing location used for one of the pre-identified dynamically-exportable services so as to globally redirect control to a subclassing routine.

17. The subclassing method of claim 16 further comprising the step of:

(b) modifying the pre-identified software module so as to force the dynamic-loader to consult the modified export data section and to use the new vector value.

18. The subclassing method of claim 17 wherein said step (b) of modifying the pre-identified software module includes:

(b.1) altering a time stamp of the pre-identified software module.

19. The subclassing method of claim 16 wherein said pre-identified software module is a dynamically-linked kernel of an operating system.

20. An instructing device according to claim 19 wherein said instructing device further produces instructions for causing the instructable data processing device to carry out operations that cause performance of the following further step:

(b) modifying the pre-identified software module so as to force the dynamic-loader to consult the modified export data section and to use the new vector value.

21. An instructing device for instructing an instructable data processing device to carry out a subclassing operation method that subclasses one or more pre-identified dynamically-exportable services of a pre-identified software module, wherein the pre-identified software module includes an export data section that is usable by a dynamic loader for dynamic-linking of other software modules to dynamically-exportable services of the pre-identified software module, said instructing device producing instructions for causing the instructable data processing device to carry out operations that cause performance of the following step:

(a) writing into the export data section, a new vector value at a vector-storing location used for one of the pre-identified dynamically-exportable services so as to globally redirect control to a subclassing routine.

* * * * *

UNITED STATES PATENT AND TRADEMARK OFFICE
CERTIFICATE OF CORRECTION

PATENT NO.  : 5,812,848
DATED       : September 22, 1998
INVENTOR(S) : Leonardo Cohen It is certified that error appears in the above-indentified patent and that said Letters Patent is hereby corrected as shown below:

```
Column 4,  line 40, "idata" should be --.idata--.
Column 7,  lines 61, 62, 63, 66, "Wind32" should be --Win32--.
Column 8,  line 4, "(VM)" should be --(VMM)--.
Column 8,  lines 12, 20, 23, "Wind32" should be --Win32--.
Column 8,  lines 55, 56, "Wind32" should be --Win32--.
Column 8,  line 63, "Wind32" should be --Win32--.
Column 9,  line 9, "Wind32" should be --Win32--.
Column 10, line 36, "Dec. 31, 1969" should be --12/31/69--.
Column 10, line 45, "(e.g., text)" should be --e.g., .text--.
Column 10, line 47, "(e.g., data)" should be --e.g., .data--.
Column 12, line 2, "idata" should be --.idata--.
Column 14, line 7, "Wind32" should be --Win32--.
Column 14, line 60, "Wind32" should be --Win32--.
Column 15, line 18, "Wind32" should be --Win32--.
Column 16, line 15, "sublassing" should be --subclassing--.
Column 17, lines 49, 55, "Wind32" should be --Win32--.
Column 18, lines 7, 9, "Wind32" should be --Win32--.
```

Signed and Sealed this

Twentieth Day of July, 1999

Attest:

Attesting Officer

Q. TODD DICKINSON

Acting Commissioner of Patents and Trademarks